US010005385B2

(12) United States Patent
Huang

(10) Patent No.: US 10,005,385 B2
(45) Date of Patent: Jun. 26, 2018

(54) TRUCK BUCKET DOOR WITH A WARNING DEVICE

(71) Applicant: Chun-Ming Huang, Taichung (TW)

(72) Inventor: Chun-Ming Huang, Taichung (TW)

(*) Notice: Subject to any disclaimer, the term of this patent is extended or adjusted under 35 U.S.C. 154(b) by 22 days.

(21) Appl. No.: 15/215,630

(22) Filed: Jul. 21, 2016

(65) Prior Publication Data

US 2018/0022271 A1  Jan. 25, 2018

(51) Int. Cl.
*B60Q 1/30* (2006.01)
*B60Q 1/24* (2006.01)
*B60Q 1/26* (2006.01)
*B60Q 1/32* (2006.01)

(52) U.S. Cl.
CPC ............... *B60Q 1/30* (2013.01); *B60Q 1/24* (2013.01); *B60Q 1/26* (2013.01); *B60Q 1/323* (2013.01)

(58) Field of Classification Search
CPC . B60Q 1/24; B60Q 1/26; B60Q 1/323; B60Q 1/50; B60Q 2400/50; B60Q 1/32; B60R 1/06; B61L 23/041; B61L 29/30
See application file for complete search history.

(56) References Cited

U.S. PATENT DOCUMENTS

| 7,226,112 B2 * | 6/2007 | Ward | B60J 5/101 296/146.8 |
| 2002/0190849 A1 * | 12/2002 | Orzechowski | B60Q 5/001 340/425.5 |
| 2005/0253694 A1 * | 11/2005 | Kuznarowis | B61L 23/041 340/436 |
| 2008/0022596 A1 * | 1/2008 | Boerger | E06B 9/82 49/31 |
| 2009/0273941 A1 * | 11/2009 | Englander | B60Q 1/24 362/464 |
| 2016/0001700 A1 * | 1/2016 | Salter | B60Q 1/56 362/510 |
| 2017/0210282 A1 * | 7/2017 | Rodriguez Barros | B60Q 1/323 |

* cited by examiner

Primary Examiner — Mirza Alam
(74) Attorney, Agent, or Firm — Bacon & Thomas, PLLC

(57) ABSTRACT

A truck bucket door has a door panel and at least one warning device. The least one warning device is mounted on the door panel, and each one of the at least one warning device has a casing, a circuit board, a detecting switch, and at least one illuminating device. The casing is translucent and is securely mounted on the door panel. The circuit board is held in the casing. The detecting switch is mounted on the circuit board and has a capability of detecting a movement of the door panel. The at least one illuminating element is mounted on the circuit board and is electrically connected with the detecting switch.

1 Claim, 8 Drawing Sheets

TRUCK BUCKET DOOR WITH A WARNING DEVICE

BACKGROUND OF THE INVENTION

1. Field of the Invention

The present invention relates to a truck bucket door, and more particularly to a truck bucket door having a warning device.

2. Description of Related Art

A truck bucket door, such as a rear door or a side door, can be opened or be moved downward to the ground by a lifting device to enable the user to transport goods into the truck bucket. However, the conventional truck bucket door does not have any warning device, so approaching cars or pedestrians easily bump with the opened truck bucket door and cause accidents.

To overcome the shortcomings, the present invention tends to provide a truck bucket door to mitigate or obviate the aforementioned problems.

SUMMARY OF THE INVENTION

The main objective of the invention is to provide a truck bucket door having a warning device to emit a warning signal while the door is opened so as to improve the safety of the operation of the truck bucket door.

The truck bucket door has a door panel and at least one warning device. The least one warning device is mounted on the door panel, and each one of the at least one warning device has a casing, a circuit board, a detecting switch, and at least one illuminating device. The casing is translucent and is securely mounted on the door panel. The circuit board is held in the casing. The detecting switch is mounted on the circuit board and has a capability of detecting a movement of the door panel. The at least one illuminating element is mounted on the circuit board and is electrically connected with the detecting switch.

Other objects, advantages and novel features of the invention will become more apparent from the following detailed description when taken in conjunction with the accompanying drawings.

DETAILED DESCRIPTION OF PREFERRED EMBODIMENT

Figure 1:
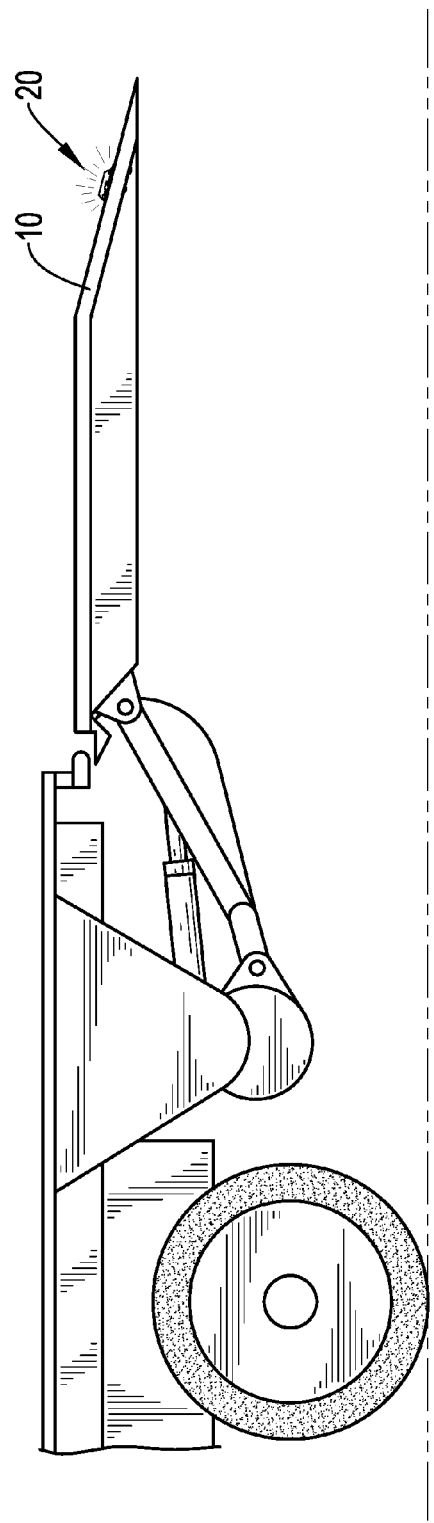
FIG. 1 is a side view of a first embodiment of a truck bucket door in accordance with the present invention.
Figure 6:
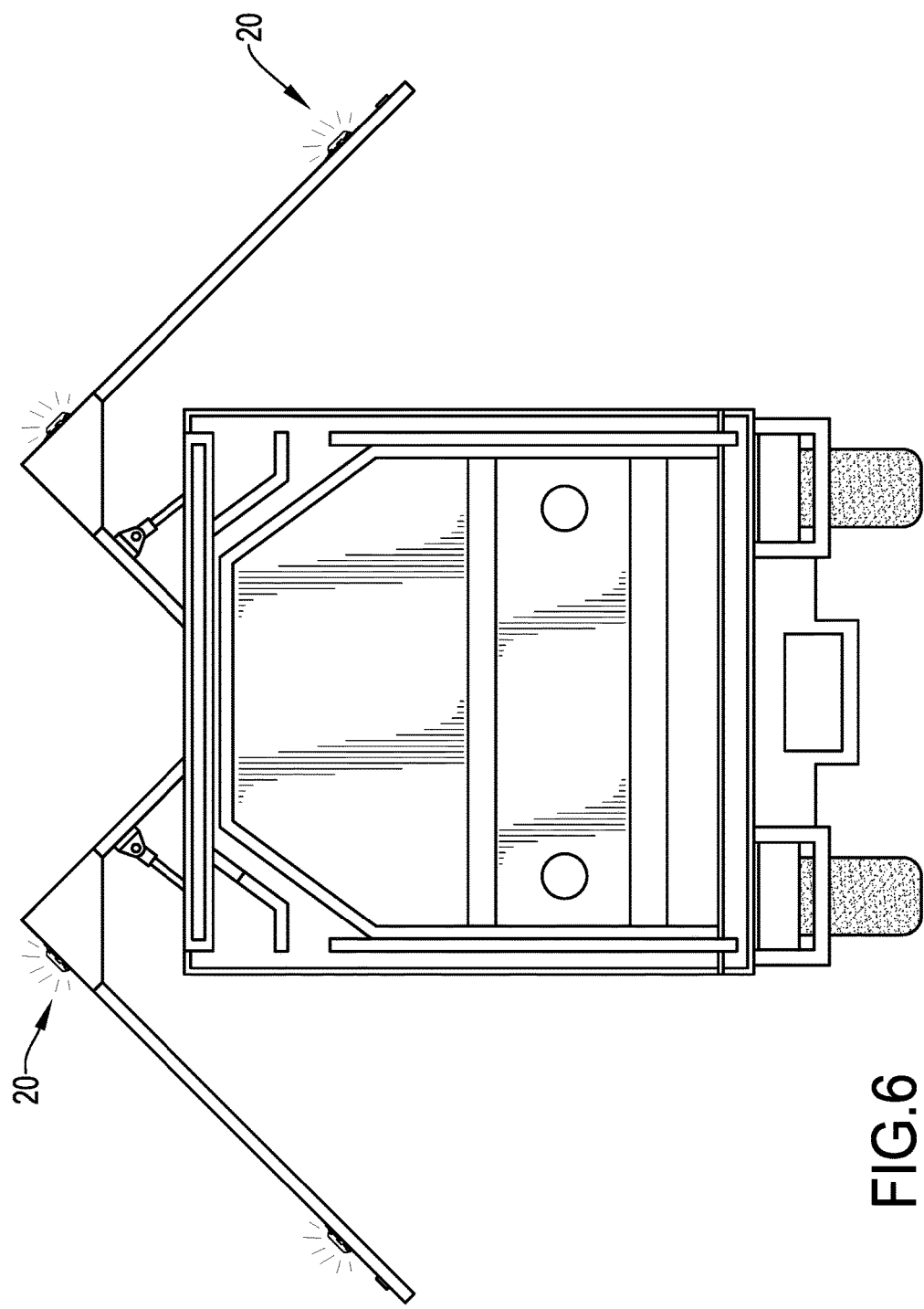
FIG. 6 is a rear view of a second embodiment of a truck bucket door in accordance with the present invention.
Figure 7:
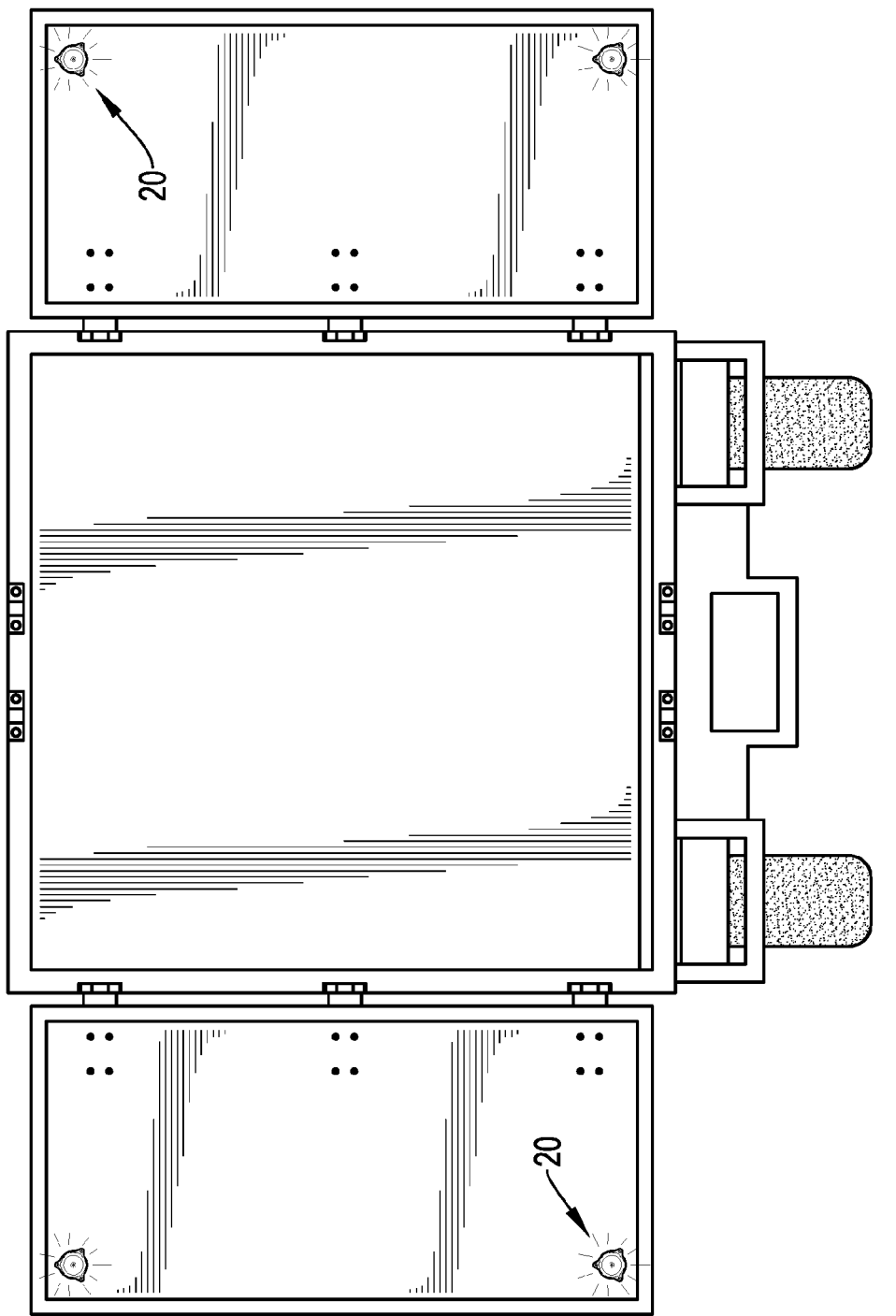
FIG. 7 is a rear view of a third embodiment of a truck bucket door in accordance with the present invention.
Figure 8:
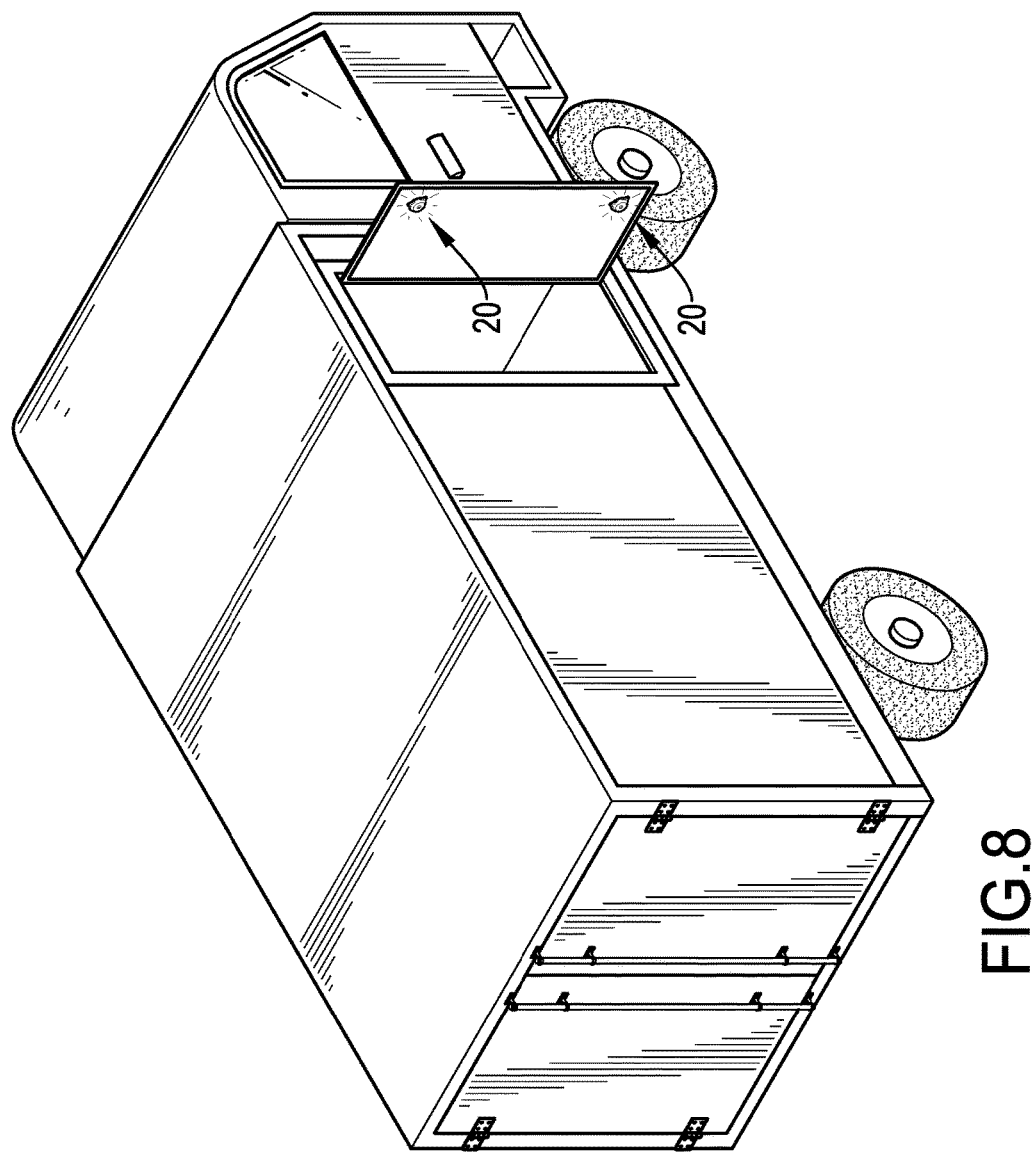
FIG. 8 is a perspective view of a fourth embodiment of a truck bucket door in accordance with the present invention.

With reference to FIG. 1, a truck bucket door in accordance with the present invention may be a rear door of a truck bucket and can be moved upward and downward by a lifting device. The truck bucket door in accordance with the present invention may be a rear door that can be manually opened as shown in FIG. 7, or a side door as shown in FIGS. 6 and 8. The truck bucket door in accordance with the present invention comprises a door panel 10 and at least one warning device 20 mounted on the door panel 10. Preferably, the at least one warning device 20 is mounted on the door panel 10 at a position adjacent an end of the door panel 10 that is opposite a junction between the door panel 10 and the truck bucket. In addition, the warning device 20 can be mounted on an outer side or an inner side of the door panel. In a preferred embodiment, two warning devices 20 are implemented in amount and are respectively located at positions adjacent to two sides of the door panel 10.

Figure 2:
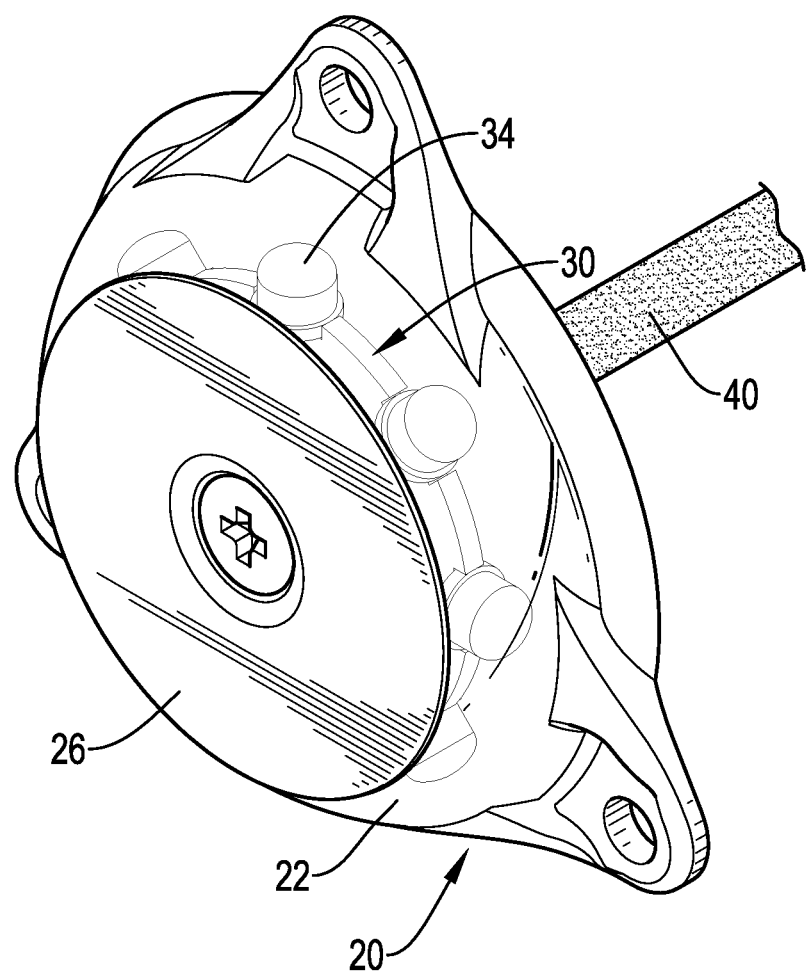
FIG. 2 is a perspective view of a first embodiment of a warning device in accordance with the present invention.
Figure 3:
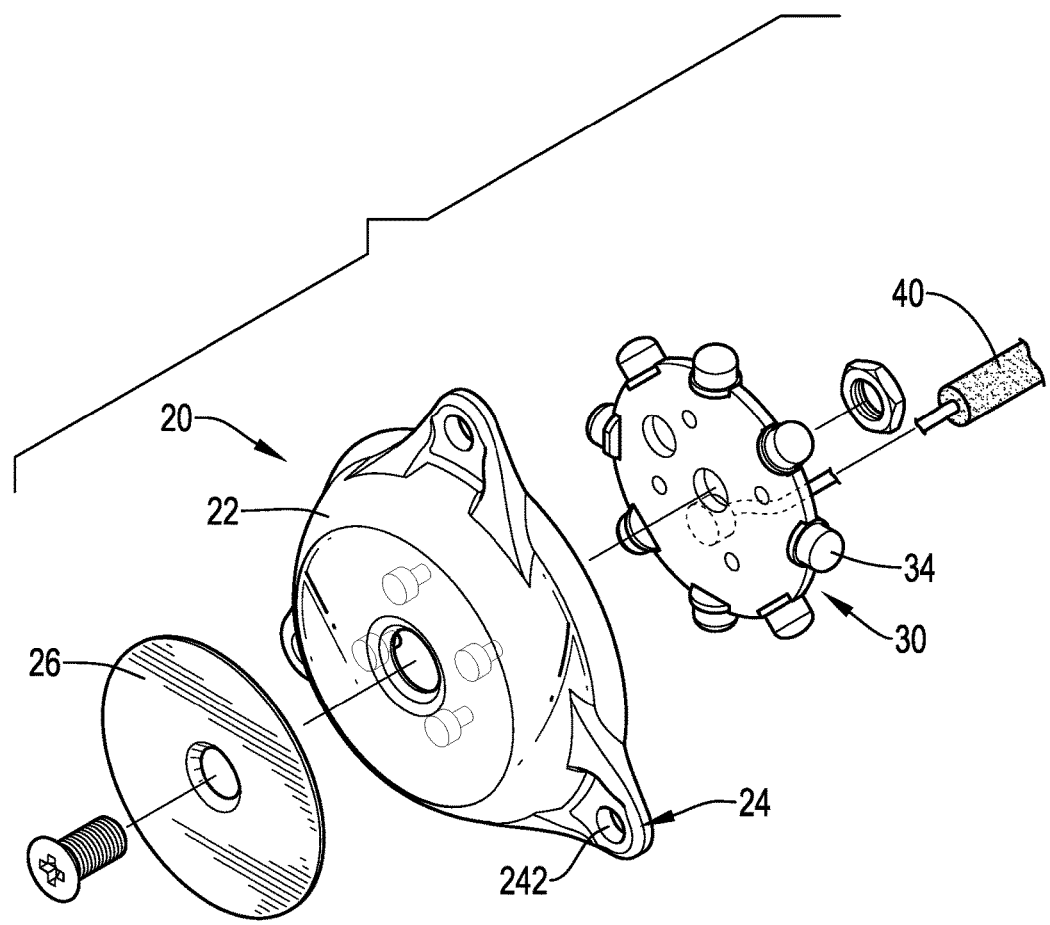
FIG. 3 is an exploded perspective view of the warning device in FIG. 2.
Figure 4:
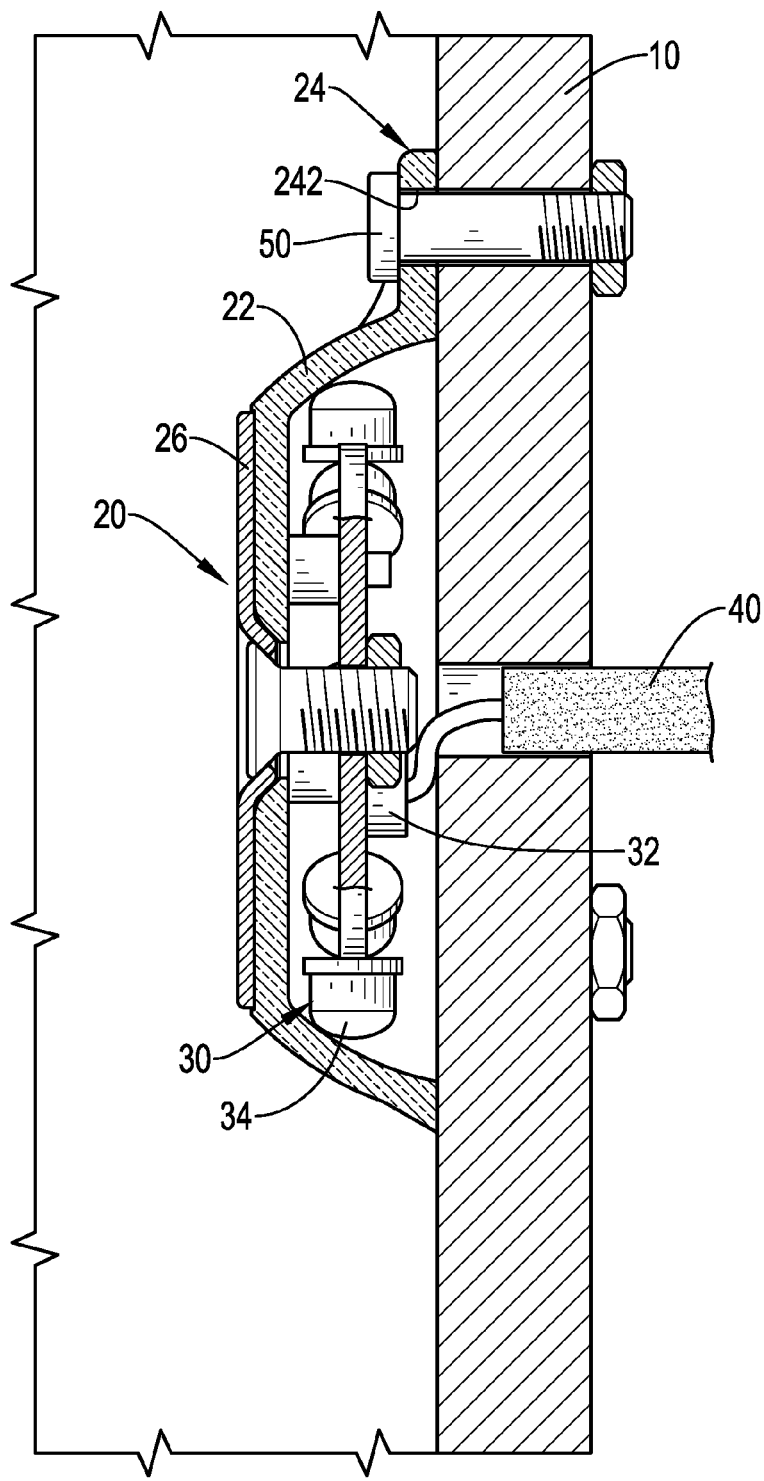
FIG. 4 is a side view in partial section of the warning device in FIG. 2.

With reference to FIG. 2 to 4, the warning device 20 comprises a casing 22, a circuit board 30, a detecting switch 32, and at least one illuminating element 34. The casing 22 is translucent and is securely mounted on the door panel 10. The casing 22 may be hollow and has multiple fixing tabs 24 formed on and protruding from a periphery of the casing 22. Each fixing tab 24 has a through hole 242 defined through the fixing tab 24. Multiple fasteners 50 may be bolts, are mounted respectively through the through holes 242 in the fixing tabs 24 and are securely connected with the door panel 10. In addition, the casing 22 further has a metal reinforcing tab 26 mounted on a top of the casing 22. With the arrangement of the metal reinforcing tab 26, the structural strength of the casing 22 can be enhanced, and the casing 22 can be kept from being crashed or broken by a heavy load.

The circuit board 30 is held in the casing 22 and is electrically connected with a power source by a wire 40. The detecting switch 32 is mounted on the circuit board 30 and has a capability of detecting a movement of the door panel 10. When the door panel 10 is opened, the detecting switch 32 can detect the movement of the door panel 10 and is turned on to allow the electrical power of the power source to be transmitted to the circuit board 30. Preferably, the detecting switch 32 may be a rotation-detecting switch, a centrifugal switch, an angle switch, a tilt angle switch, a vibration switch, a proximity switch, a ball switch, a mercury switch, a reed switch, a spring switch, a Hall IC (integrated circuit), or a gyro. The at least one illuminating element 34 is mounted on the circuit board 30 and is electrically connected with the detecting switch 32. Each illuminating element 34 may be a light bulb or an LED (light emitting diode).

With such an arrangement, when the door panel 10 is opened manually or by an electric, hydraulic, or pneumatic device, the detecting switch 32 can detect the movement of the door panel 10. The detecting switch 32 is then turned on, such that the electrical power can be transmitted to the circuit board 30 and the at least one illuminating element 34 can emit light. Accordingly, a warning effect can be provided to the approaching cars or pedestrians to prevent the approaching cars or pedestrians from bumping with the opened door panel 10. Thus, the safety of the operation of the truck buckle door can be improved.

Figure 5:
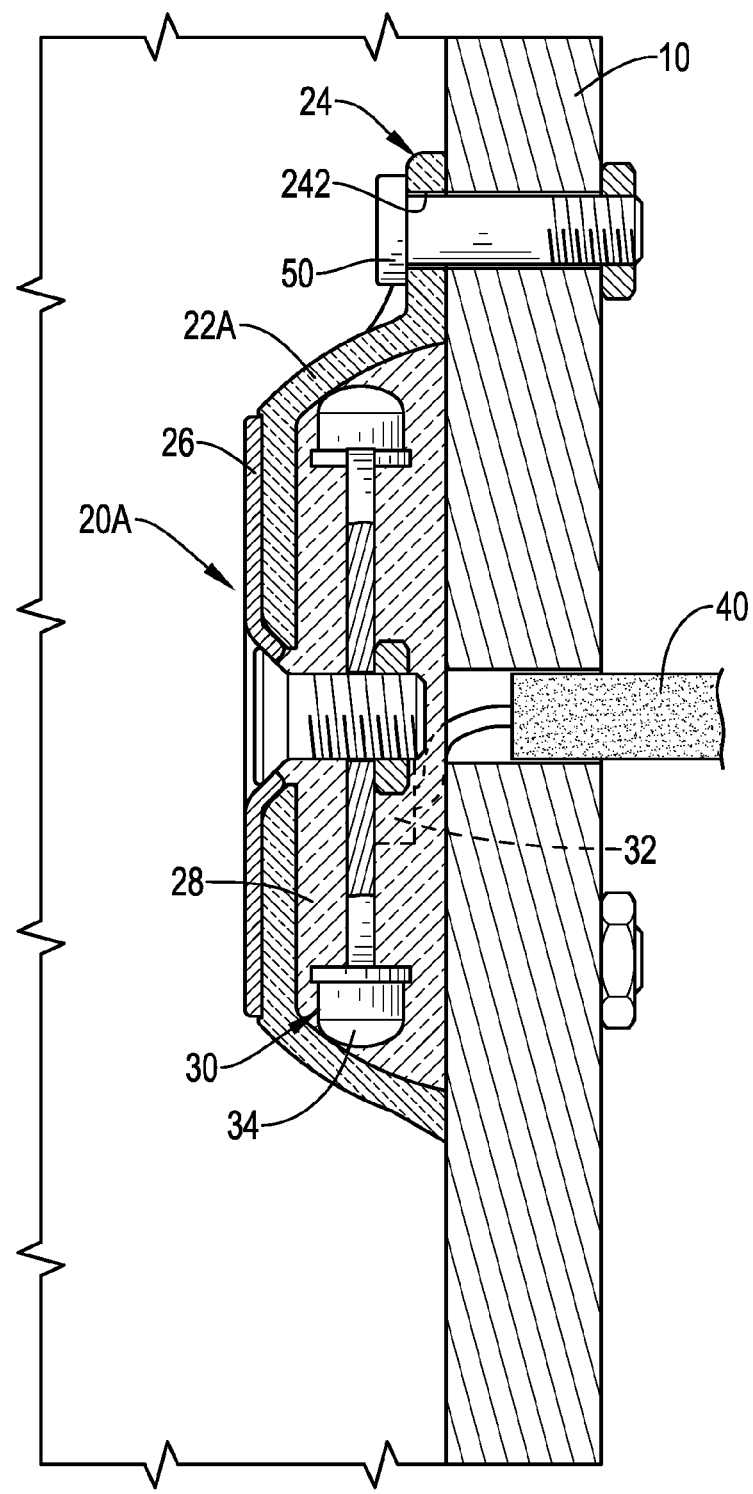
FIG. 5 is a side view in partial section of a second embodiment of a warning device in accordance with the present invention.

With reference to FIG. 5, in the second embodiment of the warning device 20A, the casing 22A further has a stuffing 28 stuffed in the casing 22A, and the circuit board 30, the detecting switch 32, and the at least one illuminating element 34 are embedded in the stuffing 28. With the arrangement of the stuffing 28, the casing 22A is solid and can be prevented from being crashed or broken by a heavy load. Accordingly, the structural strength of the casing 22A can be enhanced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A truck bucket door comprising:
   a door panel; and
   at least one warning device mounted on and protruding from a side of the door panel, and each one of the at least one warning device comprising
   a casing being translucent and securely mounted on the door panel; a circuit board held in the casing;
   a detecting switch mounted on the circuit board and having a capability of detecting a movement of the door panel; and
   at least one illuminating element mounted on the circuit board and electrically connected with the detecting switch,
   wherein the casing further has a metal reinforcing tab mounted on a side of the casing away from and opposite the door panel,
   wherein the casing is hollow and has multiple fixing tabs formed on and protruding from a periphery of the casing, each fixing tab has a through hole defined through the fixing tab, and multiple fasteners are mounted respectively through the through holes in the fixing tabs and are securely connected with the door panel, and
   wherein the casing further has a stuffing stuffed in the casing, and the circuit board, the detecting switch, and the at least one illuminating element are embedded in the stuffing.

\* \* \* \* \*